US007716425B1

(12) United States Patent
Uysal et al.

(10) Patent No.: US 7,716,425 B1
(45) Date of Patent: May 11, 2010

(54) PREFETCHING DATA IN DISTRIBUTED STORAGE SYSTEMS

(75) Inventors: Mustafa Uysal, Palo Alto, CA (US); Arif Merchant, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 682 days.

(21) Appl. No.: 11/527,868

(22) Filed: Sep. 27, 2006

(51) Int. Cl.
*G06F 13/00* (2006.01)
(52) U.S. Cl. ...................................... 711/137; 711/154
(58) Field of Classification Search .................. 711/154, 711/137
See application file for complete search history.

(56) References Cited

U.S. PATENT DOCUMENTS

2007/0005905 A1* 1/2007 Yasue et al. .................. 711/137

OTHER PUBLICATIONS

Prefetching and Caching Techniques in File Systems for MIMD Multiprocessors, David F. Kotz, PhD Thesis, Report No. CS-1991-16, Department of Computer Science, Duke University, Durham NC, Apr. 2, 1991.*

Kotz, et al. "Prefetching in File Systems for MIMD Multiprocessors" IEEE Transactions on Parallel and Distributed Sytems, vol. 1, No. 2 Apr. 1990.

Kotz, David, "Practical Prefetching Techniques for Parallel File Systems" IEEE, 1991.

* cited by examiner

*Primary Examiner*—Matt Kim
*Assistant Examiner*—John P Fishburn

(57) ABSTRACT

Embodiments include methods, apparatus, and systems for prefetching data in distributed storage systems. One method of software execution includes using input/output (I/O) requests from multiple separate networked storage nodes in a distributed storage system to prefetch data for one of the multiple separate networked storage nodes.

20 Claims, 6 Drawing Sheets

PREFETCHING DATA IN DISTRIBUTED STORAGE SYSTEMS

BACKGROUND

Prefetching is a technique for moving data objects up in the memory hierarchy before the data objects are actually required. Movement of data improves the access latency if they are subsequently requested. In a disk array, for instance, prefetching moves data from disks to the disk array cache, from the disk array to the host memory, and from the host memory to the processor cache. Since the input/output (I/O) latency of the disk array is much slower than the processing speed of the host, prefetched data located in the cache at the time of a request helps avoid disk I/O latency.

Currently, numerous existing techniques are known for prefetching data. These techniques, however, are largely in the context of a single storage node. Many techniques for single nodes assume that the I/O requests are all local to the storage node and all requests can be observed. For example, some techniques use a "just in time" prefetching on a single storage node by estimating the amount of time it will take to fetch the data from disk and by scheduling the request so that the prefetch will finish just as the data request arrives (assuming it arrives at the predicted time). Other prediction techniques rely on some knowledge of the application, and some techniques have been applied to prefetching data from disks.

DETAILED DESCRIPTION

Figure 1:
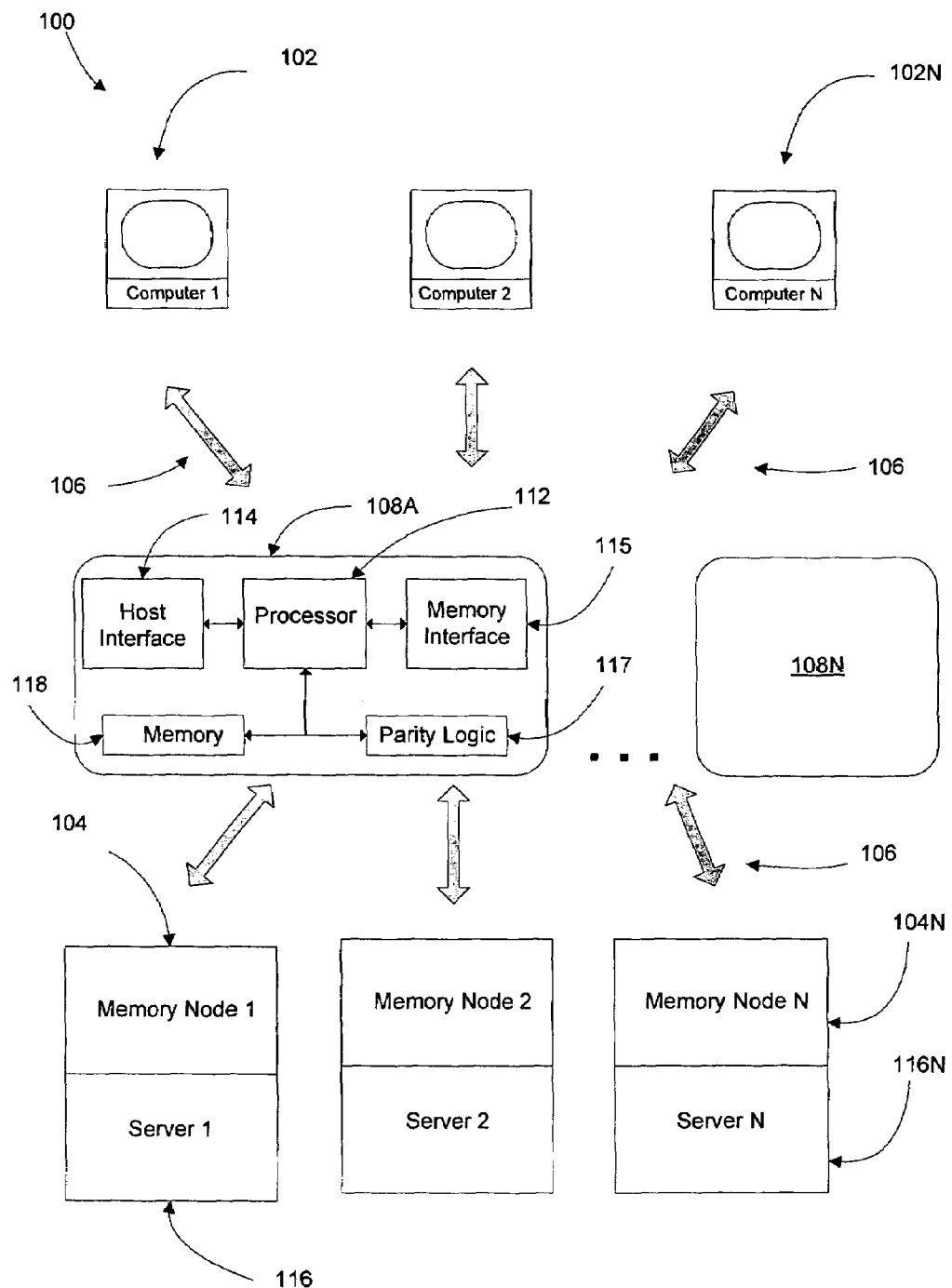
FIG. 1 is an exemplary block diagram for a distributed storage system in accordance with an exemplary embodiment of the present invention.

Embodiments in accordance with the present invention are directed to apparatus, systems, and methods for prefetching data in a distributed storage system. More particularly, exemplary embodiments relate to prefetching data in distributed storage systems in which related data are distributed across multiple storage nodes connected together by a network. The distributed storage system gathers information about global I/O requests and uses this information to predict future requests and make cache eviction decisions at each node. Additionally, exemplary embodiments use global information for pre-fetching and caching decisions even when only partial information about the global sequence of I/Os is available.

In one exemplary embodiment, distributed storage systems (such as disk arrays) attempt to predict what data will be requested (read) in the near future, and attempt to fetch this data in advance from the slow medium (disk arrays) to fast memory (example, cache), so that when the request arrives, it is quickly executed. For example, exemplary embodiments gather global information about read requests across some or all the disk arrays for a number of sequential blocks. The global information (which can also include local observations) is used to deduce the next block in the sequence to be requested.

In one exemplary embodiment, a storage node examines I/O requests histories for other nodes. The storage node uses the request history from other nodes to make a prediction and prefetch data. Predictions are also made with partial histories of I/O requests from one, several, or all storage nodes in the network. Exemplary embodiments also utilize or examine the uncertainty of the prediction in prefetching and caching decisions that are made.

One exemplary embodiment includes a distributed storage system where data is striped over a number of networked storage nodes. Data striping is a process that segments or divides logically sequential data (such as a single file) such that the segments are written to multiple separate physical devices (example, disk drives). Any one of various databases stripe data using software and/or hardware control. As one example, storage nodes are separate and distributed throughout the network. In some instances, each node sees only a part of the stream of I/O requests. However, knowledge of the I/O requests at other nodes assists a storage node or other device to predict I/O requests that a storage node will receive in the future. Thus, I/O access information from different storage nodes in the network that receive portions of striped data is used to pre-fetch data in advance of a future request. Exemplary embodiments improve the latency between the request and arrival time of data.

Exemplary embodiments predict future data requests (both the data addresses and the time of arrival of the request) from either full or partial information about the global I/O request history. In one exemplary embodiment, techniques are presented to extrapolate future I/O access patterns based only on the past history of the I/O operations at the local node and the partial knowledge of the I/O operations executed at other nodes (example, as part of a quorum-based read/write protocol). Exemplary embodiments also suggest a number of heuristic pre-fetching policies based on this information and policies for the cache eviction based on these predictions.

FIG. 1 is a block diagram of an exemplary distributed file system or distributed storage system (DSS) 100 with one or more controllers in accordance with an exemplary embodiment. The DSS 100 includes a plurality of computers 102 (of which computer 1 to computer N are exemplary) and a plurality of distributed storage or memory nodes 104 (of which node 1 to node N are exemplary) interconnected by one or more networks 106 to one or more storage controllers 108 (of which storage controllers 108A to 108N are exemplary).

The computers 102 are used by a human operator or by some software system. More specifically, computers 102 are systems that are capable of and intended for use in processing application software (example, one or more programs designed for end users or host systems).

Memory nodes 104 are network attached devices providing random access memory (RAM) and/or disk space (for storage and as virtual RAM) and/or some other form of storage such as tapes, micromechanical systems (MEMS), optical disks or the like, for use by the computers 102. Typically, the memory nodes include larger amounts of RAM and/or disk space than are available at computers 102. Memory nodes also include more specialized devices, such as network disk drives or disk drive arrays, (example, redundant array of independent disks (RAID)), high speed tape, magnetic random access memory (MRAM) systems or other devices, and combinations thereof. In one exemplary embodiment, the memory nodes are separate and independent disk arrays.

In another exemplary embodiment, the memory nodes include or couple to one or more servers 116 (of which servers 1 to server N are exemplary).

The storage controller 108 manages various data storage and retrieval operations. Storage controller 108 receives data read requests and data write requests from one or more computers 102 and is coupled to multiple memory nodes 104. Storage controller 108 handles the storage and retrieval of data on the multiple memory nodes 104. In one exemplary embodiment, storage controller 108 is a separate device or may be part of a computer system, such as a server. Additionally, memory nodes 104 are located in the same device as storage controller 108 or in one or more separate devices coupled to storage controller 108. In one embodiment, memory nodes 104 have approximately equal storage capacities.

The storage controller 108 includes a processor 112 that performs various operations and tasks necessary to manage the various data storage and data retrieval requests received from computers 102. Additionally, processor 112 performs various functions to prefetch data and/or communicate with memory nodes 104 for reading and writing data. Processor 112 is coupled to a host interface 114 that provides a bidirectional data communication interface to one or more computers 102. Processor 112 is also coupled to a memory interface 115 that provides a bidirectional data communication interface to multiple memory nodes 104. Parity logic 117 is coupled to processor 112 and provides processor 112 with the logic necessary to generate parity information and reconstruct lost data based on parity information. Parity logic 117 includes multiple types of parity logic depending on the types of parity supported by storage controller 108. For example, parity logic 117 includes information regarding different redundant array of independent disks (RAID) levels that are supported by storage controller 108. Memory 118 is also coupled to processor 112 and stores various information used by processor 112 when carrying out its tasks. By way of example, memory 118 includes one or more of volatile memory, non-volatile memory, or a combination of volatile and non-volatile memory.

Moreover, whereas in a shared memory system or a distributed memory system the networked nodes are not differentiated to be either computers or memory nodes, as implied by the figures, memory nodes 104 and computers 102 are distinct in at least one embodiment. In other words, in at least one embodiment, the computers 102 and memory nodes 104 are different and separate discrete elements. In certain embodiments, at least some computers 102 and memory nodes 104 are co-located, such as in a rack or even within the same system box. However, it is understood and appreciated that at least one computer 102 is logically separate from at least one other memory node 104. Further, in at least one embodiment, at least one computer 102 is physically separate from at least one memory node 104.

In at least one embodiment, the controller is implemented as a method stored on a computer-readable medium as a computer program. The form of the medium and the language of the program are understood to be appropriate for the computers 102 and memory nodes 104.

In at least one embodiment, the memory nodes 104 are passive entities that simply wait for requests from the computers 102 and/or controller 108. The memory nodes 104 are made fault tolerant by using existing replication, disk logging, and disk imaging systems and methods. Replication provides high availability when few memory nodes 104 crash, and the maximum number of memory node crashes tolerated in DSS 100 depend on the degree of replication. Further, disk imaging/logging are techniques well understood and employed in traditional database systems. One or both techniques are borrowed in DSS 100 in at least one embodiment to provide data durability when many (potentially all) memory nodes 104 crash due to power failures or similar correlated failures.

In one exemplary embodiment, the memory nodes 104 provide memory in the form of a disk or array of disks where data items to be addressed are accessed as individual blocks stored in disks (example, 512, 1024, 4096, etc. . . . bytes each) or stripe fragments (4K, 16K, 32K, etc. . . . each). Individually addressed items are disk blocks or data stripes.

Figure 2:
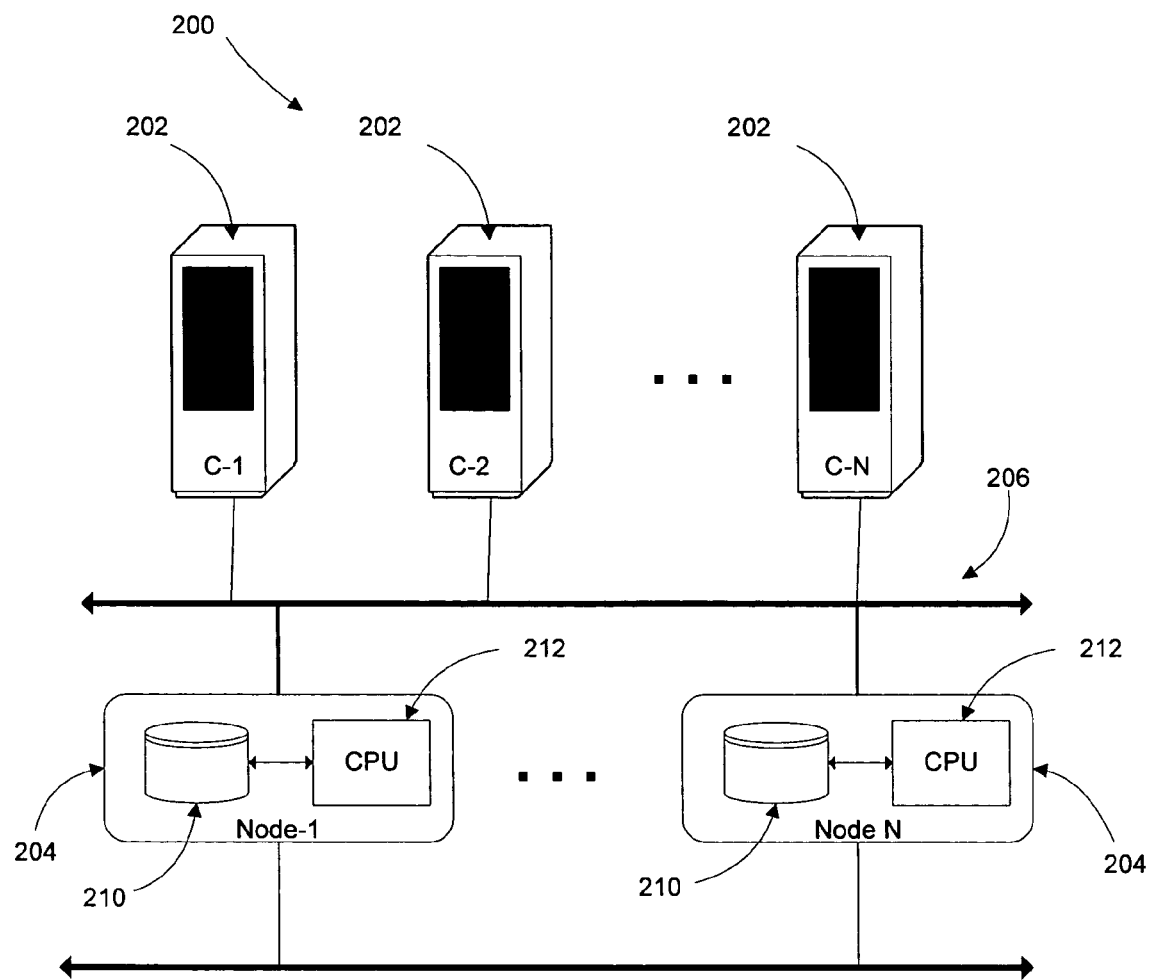
FIG. 2 is another exemplary block diagram for a distributed storage system in accordance with an exemplary embodiment of the present invention.

FIG. 2 is a block diagram of an exemplary distributed file system or distributed storage system (DSS) 200 with decentralized control in accordance with an exemplary embodiment. The DSS 200 includes a plurality of computers 202, such as a file/database server (of which computer 1 (C-1) to computer N (C-N) are exemplary) and a plurality of storage or memory nodes 204 (of which node 1 to node N are exemplary) interconnected by one or more networks 206 and communications systems.

In one exemplary embodiment, the DSS 200 is a decentralized distributed disk system in which client or host computers connect to an array of disks using standard protocol. For instance, clients issue requests to any of the memory nodes 204 to access any logical volume. The memory nodes communicate among themselves using a standard or specialized protocol. As one example, each memory node 204 includes an array of disks or storage 210 and a processor (such as a central processing unit or CPU) 212. These memory nodes are composed of electronic devices or small storage appliances built from commodity components that include disks, a CPU, non-volatile random access memory (NVRAM), memory cards, etc. The bricks connect together by a standard local area network (LAN), such as Gigabit Ethernet. Clients are presented with a number of separate and independent logical volumes, each of which is accessed as if it were a disk. In order to eliminate central points of failures as well as performance bottlenecks, each brick distributes data and coordinates input/output (I/O) requests. Thus, clients access logical volumes using a standard disk-access protocol (example, iSCSI) through a coordinator module located in each of the bricks. This decentralized architecture ensures single-copy consistency for reads and writes without a central controller (such as the embodiment of FIG. 1).

In one exemplary embodiment, redundancy provides reliability for storing and retrieving data. One method for redundancy is to stripe (i.e., distribute) data over conventional, high-reliability array memory nodes. For instance, redundancy is not provided across bricks, but each brick uses an internal redundancy mechanism, such as RAID 1 (mirroring), RAID 5 (parity coding), etc. As another example, data is mirrored (i.e., replicated) across multiple memory nodes, each of which internally uses a fault tolerance mechanism, such as RAID 0 (non-redundant striping) or RAID 5. As yet another example, an erasure code is used. A deterministic erasure code, such as Reed-Solomon or a parity code, is characterized by two parameters: m and n. The code divides a logical volume into fixed-size stripes, each with m stripe units and computes n−m parity units for each stripe (stripe units and parity units have the same size). The original m stripe unit is reconstructed out of the n stripe and parity units or a subset of the n stripe and parity units. By choosing appropriate values of m and n and unit size, users tune the capacity efficiency (cost), availability, and performance according to desired requirements.

Embodiments in accordance with the present invention are utilizable with a wide variety of distributed systems, such as those shown in FIGS. 1 and 2. In such embodiments, the data is distributed across plural separate networked storage nodes and/or devices.

Figure 3:
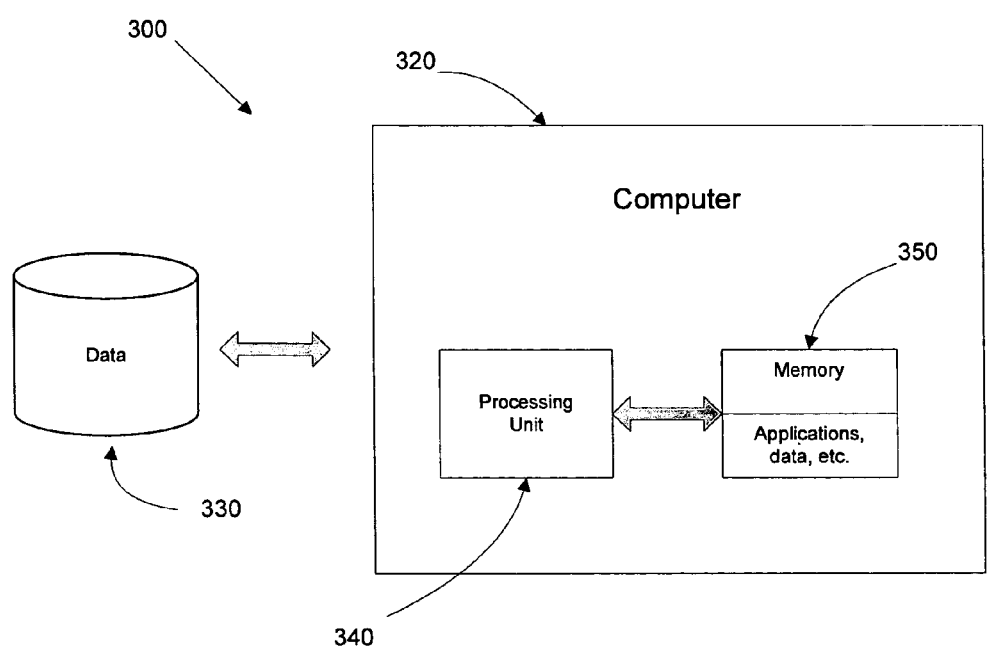
FIG. 3 is a block diagram of an exemplary computer system in accordance with an exemplary embodiment of the present invention.

Embodiments in accordance with the present invention are utilized in or include a variety of systems, methods, and apparatus. FIG. 3 illustrates an exemplary embodiment as a computer system 300 for being or utilizing one or more of the computers 102/202, memory nodes 104/204, methods, flow diagrams and/or aspects of exemplary embodiments in accordance with the present invention.

The system 300 includes a computer system 320 (such as a host or client computer) and a repository, warehouse, or database 330. The computer system 320 comprises a processing unit 340 (such as one or more processors of central processing units, CPUs) for controlling the overall operation of memory 350 (such as random access memory (RAM) for temporary data storage and read only memory (ROM) for permanent data storage). The memory 350, for example, stores applications, data, control programs, algorithms (including diagrams and methods discussed herein), and other data associated with the computer system 320. The processing unit 340 communicates with memory 350 and data base 330 and many other components via buses, networks, etc.

Embodiments in accordance with the present invention are not limited to any particular type or number of databases and/or computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

In further exemplary embodiments, the hosts of the distributed file system are not required to be homogenous. In other words, hosts have different memory sizes and processors and run different operating systems. Further, such hosts can be general purpose computers, appliances, or components of a general purpose computer.

The network connecting computers 102/202 and memory nodes 104/204 are any medium, device, or mechanism that allows nodes to communicate. Further, these nodes are not required to be homogenous or unique. Multiple different networks can connect the nodes, where each network has different characteristics. For example, one network uses wires, another uses radio transmissions, etc. Further, portions of the networks can have different bandwidths, latencies, packet sizes, access mechanisms, reliability protocols, and ordering guarantees, to name a few examples.

One exemplary embodiment predicts future I/Os with global I/O request histories. Given the complete sequence of I/O requests to a distributed storage system, any one or more of different methods are used to predict future I/Os, such as a one-block lookahead and n-block lookahead, which predict blocks i+1, i+2, i+n when block i is seen (n=1 for one-block lookahead). In a distributed storage system, each node may only see a partial set of I/O requests. In FIG. 2 for example, if a block of data is triple replicated, I/O requests complete by accessing only two of the three nodes holding the data. It is understood that the current prototype actually accesses all three nodes, but a variant protocol could access just two nodes. Even in the current prototype, the I/O request completes with just two nodes accessed.

Embodiments in accordance with the present invention use various methods for enabling individual storage nodes or other nodes to predict future I/Os. In other words, distributed nodes gather information about the global I/O sequence. Generally, this information is gathered by (1) pushing information to the nodes and/or (2) pulling the information from the nodes by inquiring about I/O operations occurring in other nodes. For instance, in one exemplary embodiment, each node or one or more designated nodes receives information about all I/Os. Exemplary embodiments include, but are not limited to, the following examples:

(1) Causing a coordinator (example, a special node that controls each I/O) to inform all nodes about I/Os it handles. This information exchange is executed in the background, without delaying the I/O, or in batches, to minimize communication overhead.

(2) Causing each node to inform one or more other nodes about all recent I/Os it knows about. This information exchange is also executed in the background.

(3) Designating one or more nodes to be "prefetch predictor nodes" that receive information about all I/Os. These nodes periodically request recent I/O history from all other nodes and construct the global I/O request history. These special nodes deduce future I/O requests for all the other nodes and inform them about the predictions.

(4) Causing nodes that happen to be idle to act opportunistically as "prefetch predictor nodes."

With global I/O request history, each storage node individually (or the prefetch predictor nodes) uses one of various methods to predict future I/Os. In one embodiment, a time series analysis is used to predict the timing of the predicted requests.

Figure 4:
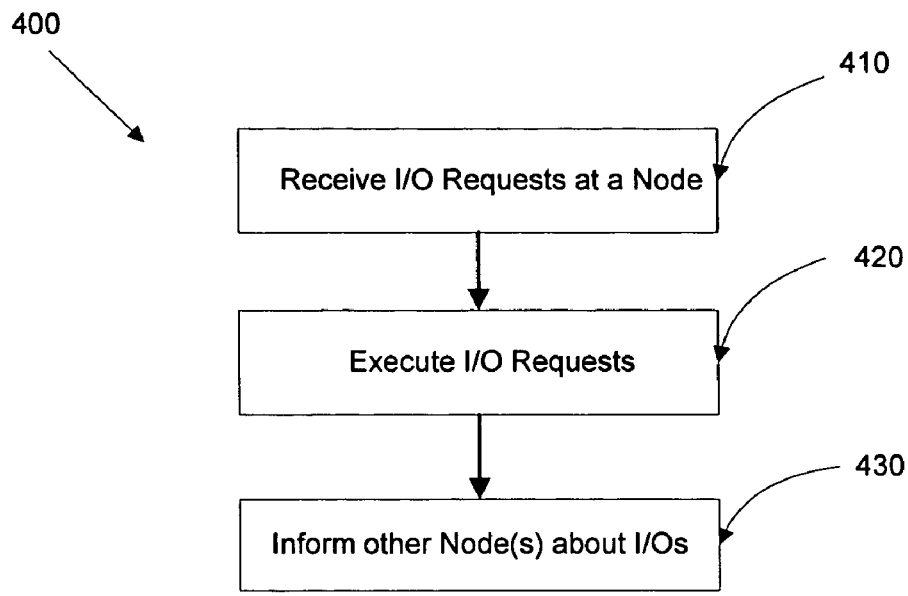
FIG. 4 is an exemplary flow diagram for predicting I/Os with a global request history in accordance with an exemplary embodiment of the present invention.

FIG. 4 is an exemplary flow diagram 400 for predicting I/Os with global request histories in accordance with an exemplary embodiment of the present invention. According to block 410, one or more nodes receive I/O requests. According to block 420, the nodes execute the I/O requests. According to block 430, the node that executed the I/O request then informs other nodes about the I/O. In one exemplary embodiment, the blocks 420 and 430 are performed in parallel.

Once a node executes or receives an I/O request, this request becomes part of or forms a portion of the global I/O history. Since data is distributed across multiple networked storage nodes, the I/O request is relevant for future predictions. Various different methods exist for storing and/or disseminating this global I/O history. In one embodiment, each storage node informs one or more other storage nodes in the network (or all storage nodes in the network) of each I/O request. In another embodiment, each storage node informs one or more coordinator nodes in the network of each I/O request. For instance, I/Os are collected and/or transmitted to and from nodes in batches.

By way of example, a central aggregation point or node is created (example, node or computer shown in FIG. 1 or 2). This central aggregation node receives all I/O requests (example, coordinates transmission of such I/O requests or receives copies of such I/O requests, etc.). The central aggregation node then informs other storage nodes about the I/O requests and/or functions as a warehouse or repository for the global I/O request history. In one exemplary embodiment, the central aggregation coordinator is a computer or program in a computer (including a memory node itself). If the central aggregation coordinator is copied on all or a portion of I/O requests, then these I/O requests are broadcast, for example, across the network. Such information is transmitted in batches, periodically, continuously, or combinations thereof. In other embodiments, the requests are transmitted only when the transmitting node is otherwise idle or not executing other instructions. As yet another example, the requests are appended or piggybacked to other data transmission or exchanges with other nodes.

Figure 5:
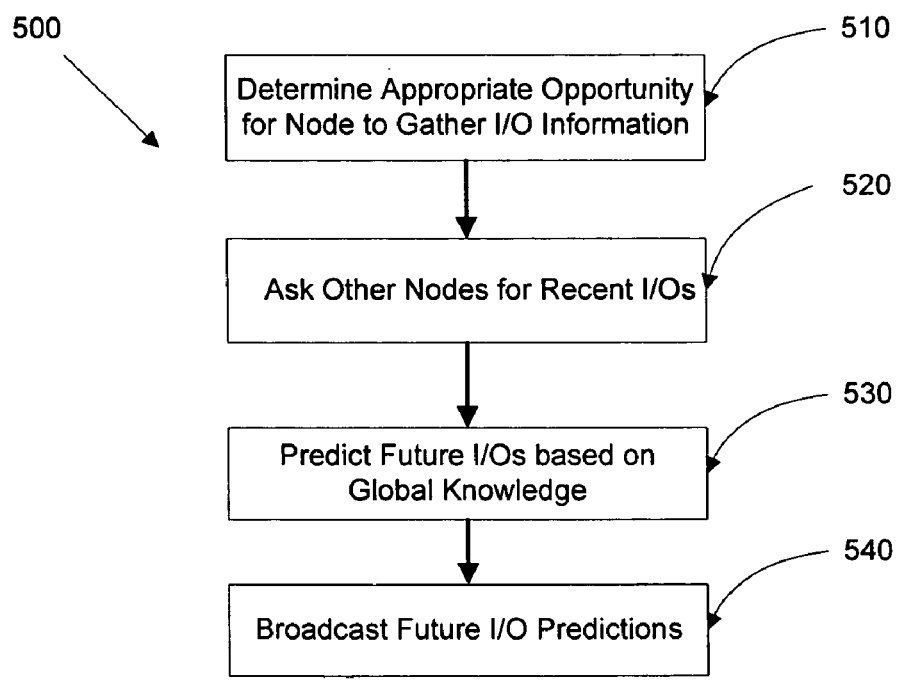
FIG. 5 is another exemplary flow diagram for predicting I/Os with a global request history in accordance with an exemplary embodiment of the present invention.

FIG. 5 is another exemplary flow diagram 500 for predicting I/Os with global request histories in accordance with an exemplary embodiment of the present invention. According to block 510, a determination is made as to when or whether an appropriate opportunity exists for a node to gather I/O information. For instance, a node gathers or requests such information only when it is idle. Here, the node decides to become a predictor node when it is idle. Predictions can be made for the node itself or for other nodes in the network. As another example, a determination is made as to whether the node has time or resources to gather information about the global I/O history (example, gather recent I/O requests from other nodes in the network). If the node has time or appropriate execution resources to allocate to this task, then the node begins to collect such I/O information. On the other hand, if the node does not have time or appropriate resources to allocate to this task, then the node passes such task to another node that has such appropriate resources or enters a deferment or sleep period for a fixed amount of time. After expiration of this time, the node makes another determination as to whether it has time or appropriate resources to allocate to the task.

According to block 520, one or more nodes ask other nodes for recent I/Os. In other words, information about recent global I/O transactions is disseminated through the network to one or more nodes (example, a memory or storage node, a coordinator node, a central node, etc.).

According to block 530, once the one or more nodes have the global I/O history, then predictions are made about future I/Os based on the global knowledge. According to block 540, these future predictions are broadcast to one or more nodes. By way of example, a central or coordinating node receives the global I/O history, assesses the historical I/O information, performs a prediction, and transmits the prediction through the network to another node.

Embodiments in accordance with the present invention also predict future I/Os with partial global I/O data or request history for the distributed storage system. While the active dissemination of request information keeps storage nodes up to date with respect to requests occurring on other nodes, it is not guaranteed that a node will have complete information. This situation arises due to a number of reasons, including, but not limited to: some distributed protocols (e.g. Quorum protocols) do not necessarily propagate all information for efficiency reasons; messages become lost, messages are arbitrarily delayed, and/or messages are intentionally delayed for efficiency reasons. In these situations, embodiments in accordance with the present invention employ a technique called partial reconstruction, where the spatial locality is detected based on the partial knowledge of an access pattern for I/Os. In one exemplary embodiment, this technique makes no assumptions about whether the request information is actively disseminated or how the quorums are implemented. Instead, the technique assumes that a quorum is required to serve a read request. Clearly, the more information available to the storage node employing the partial reconstruction technique, the better the spatial locality predictions are likely to be.

By way of illustration and without loss of generality, assume that all requests are of equal size blocks and let r1, r2, ..., rN denote the request stream for a logical unit, where each $r_i$ denotes the block number and that the ri≦rj, if I≦j≦N. Also, let us assume that these requests arrive to the logical unit with nearly equal time separating the two requests in the original stream (i.e., constant inter-arrival times). A controller in a distributed storage system sees only a subset of these requests, r'1, r'2, ..., r'M, where M≦N.

Figure 6:
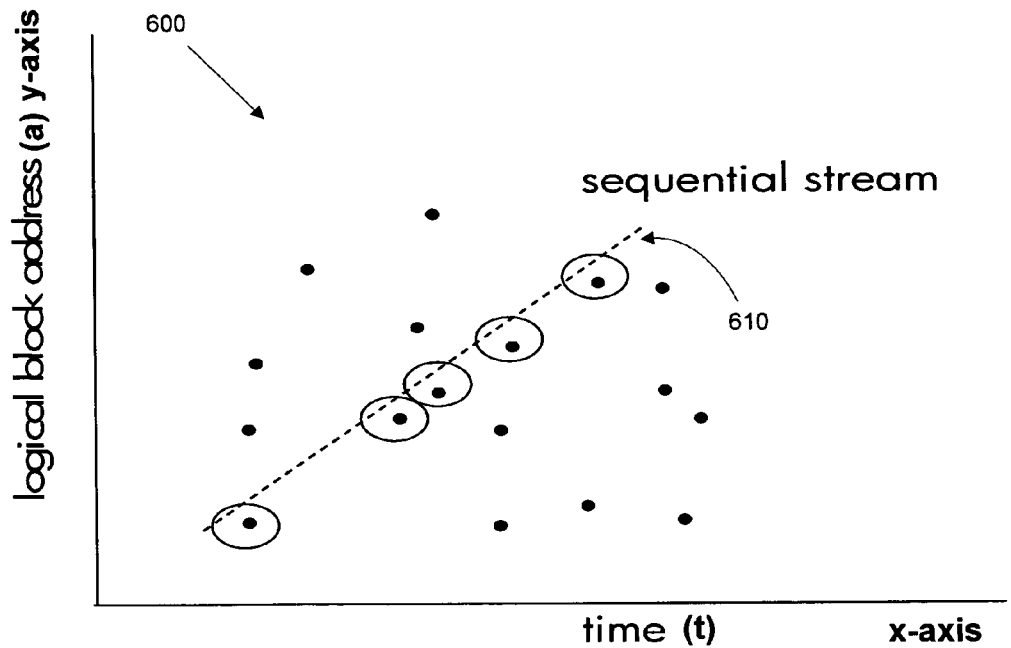
FIG. 6 illustrates an exemplary graph of block addresses for requests made to a particular logical unit versus time the request was made in accordance with an exemplary embodiment of the present invention.

FIG. 6 illustrates a graph 600 of block addresses for requests made to a particular logical unit (in the y-axis, logical block addresses (a)) versus the time the request was made (in the x-axis, time (t)) in accordance with an exemplary embodiment of the present invention. If an assumption is made that the rate at which the client requests data is approximately constant (or varies slowly in time), then a sequential stream is detected by observing whether a set of three points in this graph (representing the three accesses to the logical unit) form a straight line (shown as dashed line 610). Note that, any three requests from the original stream form a straight line if the original access pattern was sequential and the request rate is approximately constant. Even though the controller does not see the entire request stream, the controller correctly detects the spatial locality. Furthermore, the controller also identifies logical blocks that it needs to fetch next as part of the prefetch operation.

The partial reconstruction technique is extended for cases where there are multiple sequential streams concurrently occurring. Since requests belonging to an individual sequential stream will form a straight line, all that is needed is to search which three points in the partial request stream form a line. In one embodiment, this search is sped up considering a subset of the requests that arrived recently (limiting the search in time dimension) or by considering the logical block addresses that occurred should this request stream be sequential (limiting in the address dimension), or both.

Figure 7:
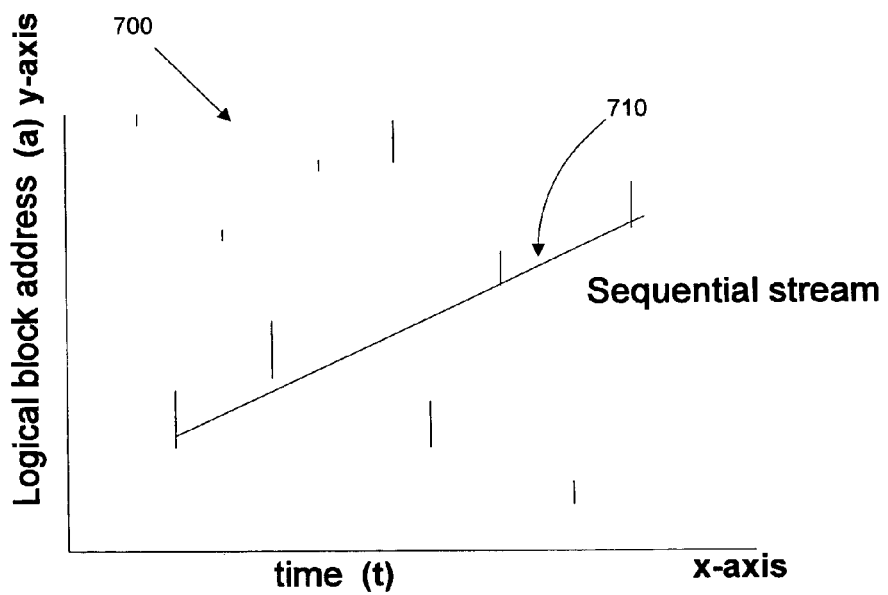
FIG. 7 illustrates another exemplary graph of block addresses for requests made to a particular logical unit versus time the request was made in accordance with an exemplary embodiment of the present invention.

FIG. 7 illustrates a graph 700 of block addresses for requests made to a particular logical unit (in the y-axis, logical block addresses (a)) versus the time the request was made (in the x-axis, time (t)) in accordance with an exemplary embodiment of the present invention. In this instance, however, let us relax the fixed request size restriction and allow arbitrary request sizes in the access streams. Here, the detection of a pattern is more complicated than FIG. 6.

As shown in FIG. 7, instead of a single point representing a request, a line segment 710 is used to represent a request. The length of the line segment is proportional to the size of the request. If we again assume that the rate with which the clients consume data from this stream is approximately constant, then the starting (bottom) points of each line will form an approximately straight line with slope $L_{bw}$ equal to the rate (bytes/sec) at which the client is consuming the data. Based on this observation, the following method predicts future IO requests and their timing.

Let a request at time t, starting at address a, of size s be denoted by <t,a,s>. Suppose a request <t0,a0,s0> is observed. From the available request history, find all requests <t,a,s> with t>t0−T and a>a0−A. If more than N requests are found, then this is part of a sequential request stream. (T, A, and N are threshold constants for the algorithm.) If so, predict that a request <t*,a*,s*> will appear in the near future, where a* is the smallest data address greater than a0+s0 found on this node, and t* and s* are unknown. Further, if the points found are <t1,a1,s1>, <t2,a2,s2>, ..., <tm,am,sm> and linear regression over <t1,a1>,<t2,a2>, ... <tm,am> finds an adequate goodness of fit for a line with slope L, then we may predict that t*=t0+(a*−a0)/L. Finally, s* may be predicted based on s0,s1,s2, ..., sm; for example, we may predict that s*=mean(s0,s1,s2, ..., sm) or s*=max(s0,s1,s2, ..., sm).

Figure 8:
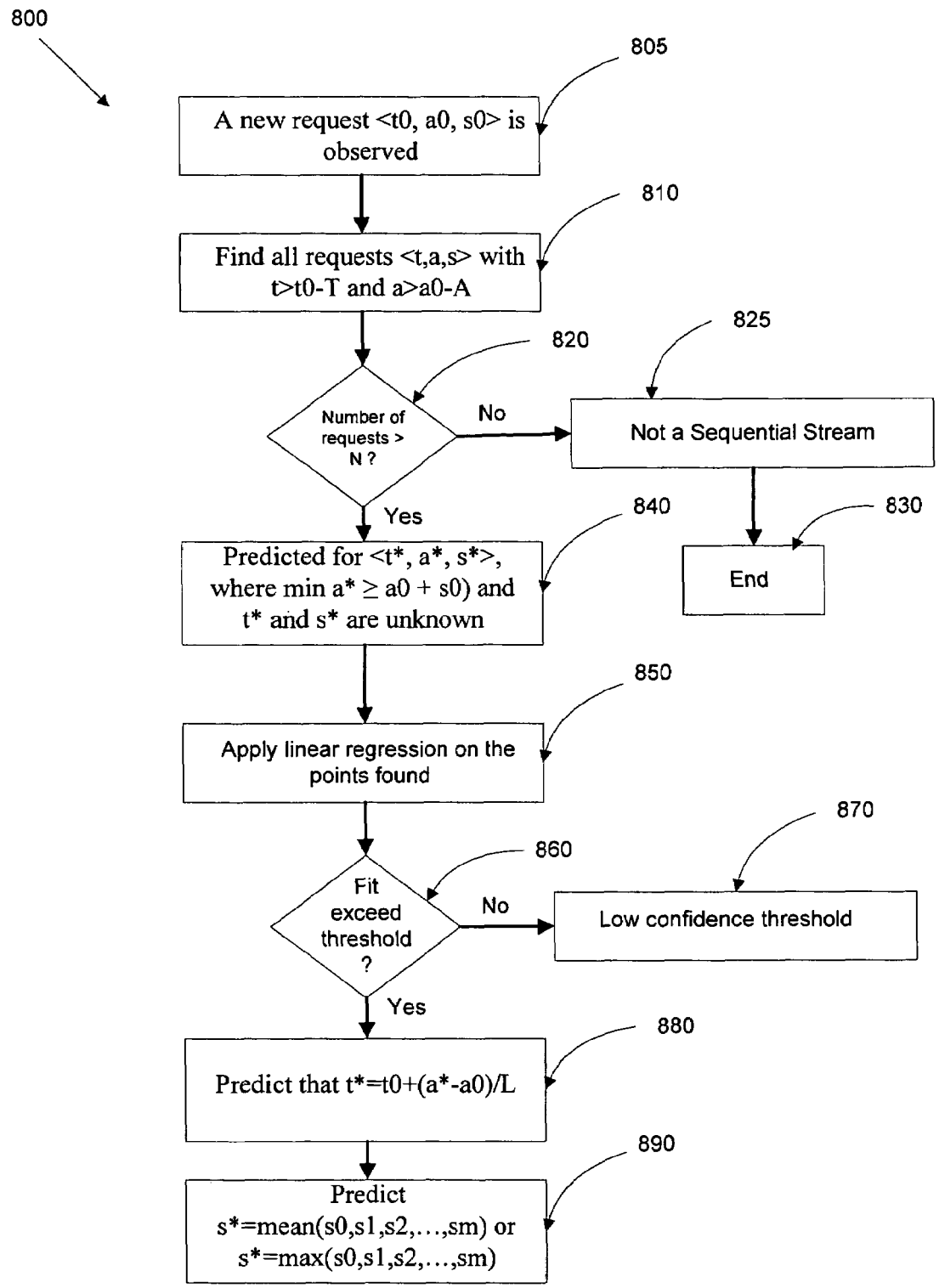
FIG. 8 illustrates an exemplary flow diagram for predicting future I/Os with a partial I/O request history in accordance with an exemplary embodiment of the present invention.

FIG. 8 illustrates an exemplary flow diagram 800 for predicting future I/Os with a partial I/O request history in accordance with an exemplary embodiment of the present invention. According to block 805, a new request <t0, a0, s0> is observed. Next, according to block 810, find all requests <t, s, a> such that t>t0−T and a >a0−A. At block 820, a question is asked: Is the number of requests found greater than N? If the answer to this question is "no," then flow proceeds to block 825 since it is not a sequential stream. Flow then ends at block 830. If the answer to this question is "yes," then flow proceeds to block 840. Here, future I/Os are predicted for <t*, a*, s*>, where min a*≧(a0+s0) and t* and s* are unknown. According to block 850, a linear regression is applied to the points found. At block 860, a question is asked: Does the fit exceed a threshold? If the answer to this question is "no," then flow proceeds to block 870 wherein a low confidence prediction exits. If the answer to this question is "yes," then flow proceeds to block 880. Here, a prediction is made wherein t*=t0+ (a*−a0)/L, where L is the slope of the fitted line. Flow then proceeds to block 890. Here, a prediction is made wherein s*=mean(s0,s1,s2, ..., sm) or s*=max(s0,s1,s2, ..., sm).

The predictions discovered in accordance with the present invention are useful for prefetching data. Given a predicted data read request, the time it is estimated to arrive and a measure of the confidence in the prediction, a number of different prefetching methods are used. These models include, but are not limited to, one or more of the following: fetch in deadline order, prefetch if confident, and combinations. In the fetch in deadline order, the predicted request is queued for prefetching with a deadline corresponding to the time it is predicted to be required, and the storage node executes the prefetch using a real-time scheduling algorithm (such as Earliest Deadline First). In the prefetch if confident, the predictions are tagged with a confidence measure based on the goodness-of-fit for the line that produced it and prefetch requests with higher confidence can be given preference. With the combination of techniques, several heuristics are combined, such as any one or more of heuristics that are currently used for prefetching in single-node storage system. Such prefetching techniques include, but are not limited to, the following:

(1) Treat the prefetch like a normal client data request. However, these requests may compete with current data requests from clients.
(2) Fetch when idle: The data is queued for fetching, and the storage node fetches the data whenever it is free (i.e., it has no current competing requests from workloads).
(3) Fetch near deadline: The storage node holds the predicted request <t*,a*,s*> until time t*−T1 and then adds it to the prefetch queue.
(4) Prefetch if space: The storage node could limit the amount of memory available for prefetched data. In this case, the predicted request is queued until there is enough space in the prefetch buffer (because previously prefetched data has been consumed by a client request or evicted because it was not used in time).
(5) Opportunistic prefetching: Depending on the location of the data on disk relative to the current disk head position and other client requests, fetch the data without incurring any extra overhead to the disks using Free-block scheduling. The storage node waits until such an opportunity arrives and then prefetches the data.

An example of such a combination is: the storage node prefetches in deadline order, but only when it is idle and if there is space in the prefetch buffer.

Embodiments in accordance with the present invention also utilize cache eviction based on prefetch predictions. Suppose that a data request is predicted for data currently found in the cache of the storage node. Since the data is already in the cache, retaining it avoids a disk read. This retention, however, comes at the cost of using up space unnecessarily in the cache if the request for the data either does not happen or happens too far in the future. A number of different approaches are within embodiments of the invention and include, but are not limited to, the following:

(1) Transfer to prefetch pool: When the cache eviction policy dictates eviction, it is moved to the prefetch pool.
(2) Promote if imminent: If the time that the cache policy dictates eviction is after t*−T2 then treat it as if it had just been read. (T2 is a threshold constant.)
(3) Transfer to prefetch buffer if imminent: If the time that the cache policy dictates eviction is after t*−T2 then move it to the prefetch buffer.
(4) Promote if confident: Promote the data item to the top of the cache if the confidence in the prediction is higher than a threshold, otherwise evict.
(5) A combination of the novel methods above can be used, possibly in conjunction with methods currently used in single-node storage systems, such as:
   (i) Independent: If the normal cache eviction policy of the dictates that the data should be evicted before time t* (when the data is predicted to be requested), it is evicted. It may be prefetched later, if the prefetch policy so dictates.
   (ii) Promote in cache: Leave the data item in the cache, but treat it as if it had just been requested. Thus, in an LRU cache, the item would move to the top of the stack. If it reaches the bottom of the stack again before time t*, it is evicted.

For example, promote in the cache if the prediction confidence is high; transfer to prefetch buffer if the cache eviction time is later than t*−T2; otherwise, evict.

Embodiments in accordance with the present invention are adaptable to a wide variety of embodiments, such as, but not limited to, adaptive management of prefetching policy. The policies discussed herein use a number of threshold parameters that need to be tuned. In one exemplary embodiment, such tuning is performed by a hill-climbing method that varies the parameter to see if the prefetch "hit" rate improves. If the hit rate does not improve, then it varies in the opposite direction. If neither works, pick a different parameter and try again.

As yet another example, exemplary embodiments are extendable to using prefetch buffer simulation to pick policies and parameters. In one exemplary embodiment, multiple prefetch policies and parameters are simultaneously simulated using relatively little memory space to see which policy works best. Since different policies might work better for different workloads, one can continuously run simulations to determine the currently optimal policy to use.

As used herein, a "file system" is a system that a program or operating system uses to manage and track files. As used herein, a "distributed file system" uses a client-server architecture to store, access, and share files and resources in the form of persistent storage over a network wherein one or more servers or computers store files that are accessed by one or more remote clients in the network. As used herein, the term "disk array" means a linked group of one or more independent disk drives. By way of example, the disk arrays include daisy chain configuration or RAID technology and organize data storage into logical units (LUs) that appear as linear blocks to clients. Further, the word "local" means files (i.e., collection of data, such as data files, text files, program files, directory files, etc.), devices (i.e., any machine or component that is or attaches to a computer, such as disk drives), and other resources (such as memory) at a workstation, computer, or node. Files, devices and resources located at other nodes (i.e., not local) on the network are "remote."

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in flow diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a storage node in a distributed storage system, the method, comprising:
designating a storage node to be a prefetch predictor node that requests input/output (I/O) histories from other nodes and constructs a global I/O history;
requesting, by the storage node, historical I/O requests from multiple separate networked storage nodes in the distributed storage system in which sequential data is distributed across the multiple separate networked storage nodes;
assessing, at the storage node, the historical I/O requests from the multiple separate networked storage nodes to predict future I/O requests that the storage node will receive for data stored in disk arrays; and
prefetching, by the storage node, the data from the disk arrays.

2. The method of claim 1 further comprising:
transmitting, from the storage node to the multiple separate networked storage nodes, local I/O requests executed at the storage node;
constructing, at the storage node, a global I/O request history that includes the local I/O requests executed at the storage node and I/O requests executed at the multiple separate networked storage nodes.

3. The method of claim 1 further comprising, predicting, at the storage node, a future data request and a future time of arrival for the data request from partial information about a global I/O request history of I/Os executed at the multiple separate networked storage nodes.

4. The method of claim 1 further comprising:
determining, by the storage node, whether the storage node has appropriate execution resources to perform a task of collecting information about a global I/O history that includes I/Os executed at the multiple separate networked storage nodes;
collecting, by the storage node, the information about the global I/O history when the storage node has the appropriate execution resources to allocate to the task;
passing the task to another storage node when the storage node does not have the appropriate execution resources to allocate to the task.

5. The method of claim 1 further comprising, receiving, at the storage node, information about global I/O requests from the multiple separate networked storage nodes to determine a pattern of I/O requests and to predict future I/O requests.

6. The method of claim 1 further comprising:
receiving, at the storage node, information about global I/O requests executed at the multiple separate networked storage nodes;
assessing, by the storage node, the global I/O requests to make predictions about future I/Os;
broadcasting, from the storage node, the predictions to the multiple separate networked storage nodes.

7. The method of claim 1 further comprising, examining, by the storage node, a sequential access pattern and request rate of prior I/O requests to predict future I/O requests for the storage node.

8. A physical computer readable medium having instructions for causing a computer to execute a method, comprising:
designating a storage node to be a prefetch predictor node that requests input/output (I/O) histories from other nodes and constructs a global I/O history;
receiving, at the storage node in a distributed storage system, a sequential stream of global prior I/O requests executed at multiple separate storage nodes in the distributed storage system in which the sequential stream of global prior I/O requests includes striped data that is divided among the multiple separate storage nodes; and assessing the global prior I/O requests from the multiple separate storage nodes that received portions of the striped data to prefetch data in advance of future I/O requests.

9. The physical computer readable medium of claim 8 having instructions for causing the computer to execute the method further comprising, identifying a spatial relationship between the global prior I/O requests to identify logical blocks to fetch as part of a prefetch operation.

10. The physical computer readable medium of claim 8 having instructions for causing the computer to execute the method further comprising, identifying a line formed of at least three points from a single sequential data stream to predict future I/O requests for the multiple separate storage nodes.

11. The physical computer readable medium of claim 8 having instructions for causing the computer to execute the method further comprising:

receiving logical block addresses striped across plural controllers;

representing I/O requests in a graph as line segments to predict future I/O requests.

12. The physical computer readable medium of claim 8 having instructions for causing the computer to execute the method further comprising:

examining prior I/O requests having arbitrary request sizes in access streams;

representing the prior I/O requests as line segments to predict timing of future I/O requests.

13. The physical computer readable medium of claim 8 having instructions for causing the computer to execute the method further comprising:

causing a designated node in the distributed storage system to inform all other nodes in the distributed storage system about historical I/O requests.

14. The physical computer readable medium of claim 8 having instructions for causing the computer to execute the method further comprising, causing each node in the distributed storage system to inform plural other nodes about previous I/O requests.

15. The physical computer readable medium of claim 8 having instructions for causing the computer to execute the method further comprising, designating plural separate nodes in the distributed storage system to receive information about I/O requests from multiple separate memory nodes.

16. A computer system, comprising:

a prefetch predictor node that requests input/output (I/O) histories from other nodes in a distributed storage system and constructs a global I/O history, the prefetch predictor node including:

a memory for storing an algorithm; and a processor for executing the algorithm to:

receive global I/Os requests from multiple separate networked storage nodes in the distributed storage system in which data is striped across the multiple separate networked storage nodes;

examine the global I/O requests executed at and received from the multiple separate networked storage nodes in the distributed storage system to predict future data requests for the multiple separate networked storage nodes; and prefetch data in advance of the future data requests.

17. The computer system of claim 16, wherein the processor further executes the algorithm to cause idle nodes in the distributed storage system to predict I/O requests for other nodes in the distributed storage system.

18. The computer system of claim 16, wherein the processor further executes the algorithm to broadcast in batches historical I/O requests to plural of the multiple separate networked storage nodes.

19. The computer system of claim 16, wherein the processor further executes the algorithm to graph the global I/O requests and to predict an approximate time at which a future I/O request will arrive at the computer system.

20. The computer system of claim 16, wherein the processor further executes the algorithm to analyze partial information about a global I/O request pattern for the multiple separate networked storage nodes in order to prefetch data and move the data from a disk to a disk array cache in the distributed storage system.

* * * * *